(12) United States Patent
Hennen et al.

(10) Patent No.: US 6,407,859 B1
(45) Date of Patent: Jun. 18, 2002

(54) FRESNEL LENS FOR PROJECTION SCREEN

(75) Inventors: Daniel W. Hennen, Cottage Grove; Robert S. Moshrefzadeh, Oakdale, both of MN (US); John C. Nelson, Thesea Ranch, CA (US); Scott M. Tapio, Falcon Heights; Patrick A. Thomas, Maplewood, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/229,198

(22) Filed: Jan. 13, 1999

(51) Int. Cl.⁷ .............................. G03B 21/60; G02B 3/08
(52) U.S. Cl. ..................... 359/454; 359/457; 359/742
(58) Field of Search ................................ 359/454, 457, 359/741, 742

(56) References Cited

U.S. PATENT DOCUMENTS

| | | | |
|---|---|---|---|
| 4,070,105 A | * 1/1978 | Marzouk | 351/159 |
| 4,190,321 A | * 2/1980 | Dorer et al. | 350/165 |
| 4,452,509 A | * 6/1984 | VanBreeman | 350/128 |
| 4,512,631 A | * 4/1985 | VanBreeman | 350/128 |
| 4,756,603 A | * 7/1988 | Ohtani | 350/276 R |
| 4,934,798 A | * 6/1990 | Bunch | 359/19 |
| 5,191,479 A | * 3/1993 | Tsuchida | 359/742 |
| 5,675,435 A | * 10/1997 | Ishii et al. | 359/460 |
| 5,751,387 A | * 5/1998 | Iigahama et al. | 349/95 |
| 6,046,847 A | * 4/2000 | Takahashi | 359/457 |

FOREIGN PATENT DOCUMENTS

| | | |
|---|---|---|
| EP | 305009 | 3/1989 |
| EP | 0 859 270 | 8/1998 |
| JP | 57-008536 | * 1/1982 |
| JP | 10-039420 | * 2/1998 |
| WO | WO 99/34254 | 7/1999 |

* cited by examiner

Primary Examiner—Christopher Mahoney
(74) Attorney, Agent, or Firm—William D. Miller (57) ABSTRACT

The present invention is a screen, such as is used in back-lit projection screens, having a Fresnel lens laminated to another layer for support. The screen includes a Fresnel lens having an output surface, and a dispersing screen supportingly attached on a first side to the output surface of the Fresnel lens.

31 Claims, 11 Drawing Sheets

FRESNEL LENS FOR PROJECTION SCREEN

BACKGROUND

The present invention is directed generally to a Fresnel lens for use with projection screens, and particularly to a Fresnel lens that reduces the effect of ghost images.

Fresnel lenses are often used in projection screens for collimating light received from the illumination source. The Fresnel lens is typically used to increase the gain of the screen at the screen edge, so that a viewer does not notice a lack of brightness uniformity across the screen.

However, a Fresnel lens typically generates a ghost image, which is the result of internal reflections within the lens and the substrate to which the lens may be attached. The ghost image may be perceived by the viewer, with the effect that the image quality is reduced and the viewer may be distracted. Consequently, the screen manufacturer has to compromise between brightness uniformity and image quality.

Therefore, there is a need for a Fresnel collimating lens, for use with a projection screen, that reduces, or avoids, the production of ghost images. The Fresnel collimating lens should also maintain the capability of effectively collimating light to provide more uniform brightness across the screen.

SUMMARY OF THE INVENTION

Generally, the present invention relates to a screen having a Fresnel lens laminated to another layer for support.

In one embodiment of the invention, a screen includes a Fresnel lens having an output surface, and a dispersing screen supportingly attached on a first side to the output surface of the Fresnel lens. In another embodiment of the invention, a screen includes a Fresnel lens having an output surface, where at least a portion of the output surface includes a Fresnel structure. A first optical layer has a first surface supportingly attached to the output Fresnel structured surface of the Fresnel lens. In another embodiment of the invention, a first layer has a first surface, and a redirecting means for redirecting light passing through the screen, has a Fresnel structured output surface. Attaching means on at least one of the first layer and the redirecting means supportingly attaches the output surface of the redirecting means to the first surface of the first layer. In another embodiment of the invention, a layer of transparent material has an input surface and a Fresnel-structured output surface having ridges formed between functional slopes and riser slopes, at least some of the ridges being truncated with flat portions essentially parallel to the input surface. In another embodiment of the invention, a layer of transparent material has an output surface with a Fresnel-structured portion proximate an edge thereof and a substantially unstructured center portion. In another embodiment of the invention, a first layer has a first surface, and a Fresnel lens having a Fresnel-structured output surface. The Fresnel-structured output surface includes functional slopes and riser slopes, and at least a portion of one functional slope and a portion of a riser slope are embedded in the first surface of the first layer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to Fresnel lenses, and is believed to be particularly suited to Fresnel lenses for use with rear projection screens and monitors. One of the advantages of the invention is that the appearance of ghost images is reduced, if not prevented altogether. Therefore, the invention may be used to improve the uniformity of the brightness perceived across the screen while retaining the quality of the image.

Among the many factors important in the design of rear-projection screens and monitors are i) efficient light use, ii) a high resolution and iii) a small form factor. A high efficiency is desirable so that the power of the light source may be reduced, thus reducing problems with disposal of waste heat, and reducing energy costs. There is a trend towards increasingly higher resolution, for example in high definition television (HDTV), to provide the viewer with a sharper, clearer image. Also, it is generally desired to reduce the form factor, such as volume, footprint or weight, so that the monitor takes up as little space in the user's environment as possible. The implementation of a large screen size, under the restriction of a small form factor leads to the use of wide-angle optical systems. Wide-angle optical geometries place higher requirements on the optical components of the screen than exist with narrow angle systems. The present invention addresses this need for wide-angle components, while permitting efficient light use and high resolution operation. The present invention also permits the maintenance and/or improvement in screen resolution, brightness and brightness uniformity from screen center to screen edge.

Figure 1:
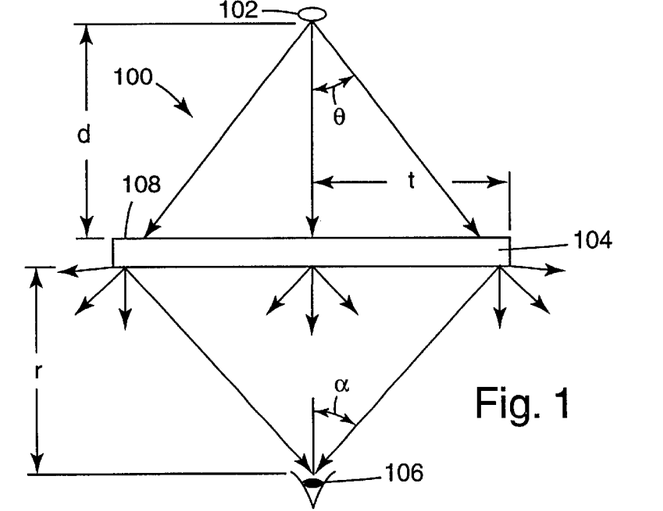
FIG. 1 illustrates the illumination of a screen without the use of collimating optics.

Consider a rear projection optical system 100 as shown in FIG. 1, having a light source 102 that illuminates a rear projection screen 104. The light source 102 is located at a distance d from the screen 104 and the half-angle cone of light emitted by the source 102 is given by $\theta$. The distance from the center of the screen 104 to the edge is given by t. A viewer's eye is typically centrally located at position 106 at a distance r from the screen 104. The angle formed between a normal to the screen 104 at the screen edge and the viewer's eye is given by the angle $\alpha$.

At the edge of the screen 104, the light is incident on the rear surface 108 at an angle equal to $\theta$, where $\theta$ is measured relative to a normal to the screen. Therefore, the forward direction of light traveling through the screen 104 continues through the screen at an angle $\theta$. The viewer perceives only that portion of light from the edge of the screen 104 that has been scattered through an angle equal to $\theta+\alpha$. Accordingly, the viewer perceives that the brightness at the edge of the screen is reduced.

Figure 2:
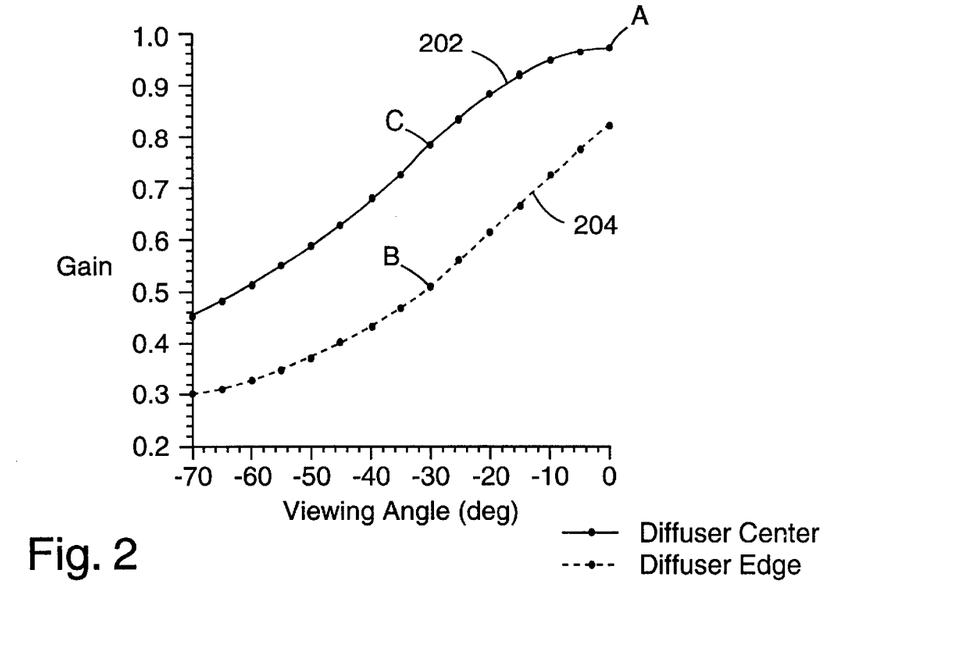
FIG. 2 is a graph showing gain at the center and edge of the screen of FIG. 1 as a function of viewing angle.

This is illustrated further in FIG. 2 which shows the measured values of gain for a screen with a viewing angle of 64°. In other words, a collimated beam of light incident on the back surface of the screen is scattered into a cone having an angle of 64° as measured by the points where the intensity falls to half of the maximum. The measured gain curves are for illuminating the screen at angles of $\theta=0°$ (continuous line, 202), and $\theta=20°$ (dashed line, 204). The viewing angle, $\alpha$, is the angle of the ray of light relative to the normal to the screen.

At the central position 106, the viewer views the center of the screen 104 at a viewing angle of zero, which is normal incidence. At the same position 106, the viewer views the edge of the screen at an angle $\alpha$. Consider first the case where the light incident on the screen 104 is not redirected between the light source and the screen, for example by a collimating Fresnel lens. In this case, the light detected by the viewer from the center of the screen 104 was incident on the screen at an angle $\theta=0°$, and so we use the upper curve 202. Since the viewer is looking directly at the center position of the screen, the viewing angle $\alpha=0°$. Therefore, the gain for light at the center of the screen is 0.97, point A.

The light detected by the viewer from the edge of the screen was incident on the screen at an angle $\theta=20°$, and so we use the lower curve 204. The viewer sees light from the edge of the screen at a viewing angle of $\alpha=-30°$, i.e. light that has been scattered through an angle of 50° (20°+30°). Therefore, the gain for light at the edge of the screen 104 is 0.51, point B. Therefore, the screen brightness perceived by the viewer is 47% less at the screen edge (gain=0.51) than at the screen center (gain=0.97). This large drop in brightness across the screen 104 is undesirable and may be very noticeable to a viewer.

Figure 3:
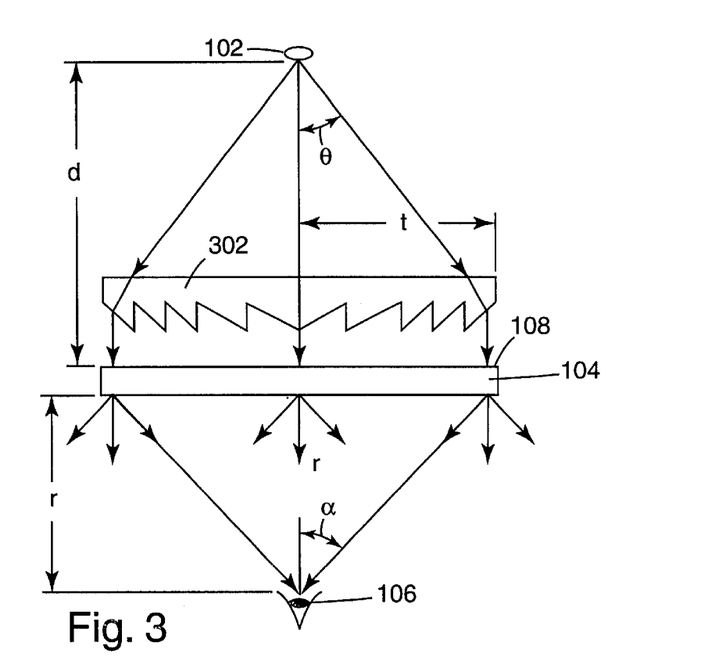
FIG. 3 illustrates the illumination of a screen using a Fresnel lens for collimation.

In one approach to substantially increase the uniformity of brightness perceived across a screen, a Fresnel lens 302 may be used to redirect the light from the light source 102 prior to incidence on the rear surface 108 of the screen 104, as illustrated in FIG. 3. In the illustrated case, the light incident on the screen 104 is collimated. The light propagates through the edge of the screen 104 in a direction parallel to the light passing through the center of the screen 104. Therefore, the light perceived by the viewer at position 106 from the edge of the screen does not need to be scattered through an angle of $\theta+\alpha$, but only an angle $\alpha$. Since, in this case, all light is incident on the screen 104 at an angle of $\theta=0°$, we use only the upper curve 202. Again, the light reaching the viewer from the center of the screen ($\alpha=0°$) has a gain of 0.97. However, in this case, the gain of the light reaching the viewer from the edge of the screen, $\alpha=30°$, is 0.78, point C. Therefore, the perceived drop in brightness from the center to the edge of the screen 104 is only about 20% when the light reaching the screen 104 is collimated by the Fresnel lens. This figure may be further improved if the Fresnel lens is configured to bend the light at the edge of the screen towards the viewer.

The use of a Fresnel lens, however, introduces additional difficulties. For example, the Fresnel lens is normally supported either around its edge or on its input surface, since there is typically an air gap between the Fresnel lens output surface and the following optical component. Where the Fresnel lens is edge-mounted, the lens is made relatively thick to so that there is some degree of self-support, otherwise the lens may move or droop into contact with other components, and change the optical characteristics of the system. Where the Fresnel lens is supported on its input surface, the lens is typically attached to a transparent sheet, such as a sheet of glass. In both of these approaches, the Fresnel lens, or Fresnel lens/support combination, is relatively thick.

A Fresnel lens typically includes at least one structured surface, each portion of the structured surface lens having a functional surface that is angled with respect to the lens in order to re-direct light passing through that particular portion. Adjacent functional surfaces are typically connected by riser slopes. The functional surfaces and riser slopes typically present a grooved structure when viewed in cross-section. The pattern of functional slopes and riser slopes is generally referred to herein as a Fresnel structure.

Figure 4:
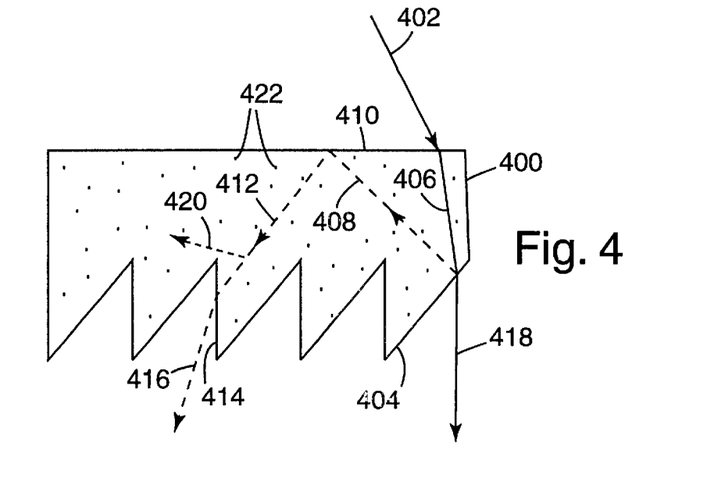
FIG. 4 illustrates the creation of ghost images in a Fresnel lens.

One problem associated with Fresnel lenses is the generation of ghost images, which is discussed with reference in FIG. 4. An incoming ray 402 enters a Fresnel lens 400 as internal ray 406 and then exits the lens 400 on an angled face 404, also referred to as a functional slope. The ray 418 that propagates through the functional slope 404 is redirected to form the primary image. However, a portion of the internal ray 406 is reflected by the functional slope 404 as reflected ray 408. A portion of the reflected ray 408 may be reflected off the entrance face 410 of the Fresnel lens as reflected ray 412. The reflected ray 412 is incident upon another facet such as a riser slope 414 of the lens 400 and passes out as emerging ray 416. The emerging ray 416 forms a secondary image. The ghost image formed by the emerging ray 416 may be perceived by the viewer and detracts from the quality of the primary image presented to the viewer, and effectively reduces the resolution of the image presented to the viewer. Therefore, it is desirable to reduce the effect of the ghost image.

There are two major approaches to reducing the effects of ghosting. One is to reduce the spatial separation between the primary and the ghost images in the plane of the screen to the point where there is no detectable separation, and the other is to reduce the amount of light in the ghost image.

The displacement of the ghost image relative to the primary image is dependent on a) the thickness of the Fresnel lens and b) the distance between the Fresnel lens and the screen and c) the angle of the functional surface. Reducing a) the Fresnel thickness and b) the separation between the screen and the Fresnel, or both, results in a reduction in the displacement of the ghost relative to the primary image. Also, reducing the angle of the functional surface results in a reduction of the separation between the ghost image primary image. The angle of the functional surface depends in part on the distance from the center of the lens and the difference in refractive index between the Fresnel lens material and the material into which the primary ray 418 travels.

When the spatial separation between the ghost and primary images in the plane of the screen is reduced to the point where the ghost image illuminates the same pixel as the primary image, then the viewer is unable to detect a ghost image. In such a case, the resolution of the image on the screen is unaffected by the Fresnel lens, while the advantages of increased brightness uniformity and light use efficiency are maintained. For example, in the case of high definition television (HDTV) having 1024 pixels across the screen, if the ghost image is separated from the primary image by less than approximately 0.098% of the screen width, then no transverse ghost image is visible.

In some situations, the Fresnel lens may be supported on a transparent sheet, such as a sheet of glass, that is attached to the input face of the Fresnel lens. Where this is the case, the reflected ray 412 that leads to the production of the ghost image may predominantly arise from reflection off a face of the transparent sheet, rather than the input surface of the Fresnel lens: the reflection at the interface between the Fresnel lens and the transparent sheet may be small due to index matching. In such a case, the separation between the ghost and primary images is not only dependent on the thickness of the Fresnel lens, but also the thickness of the transparent sheet.

Earlier approaches to reducing the brightness of the ghost image include depositing an absorptive coating on the riser slopes 414 of the Fresnel structure. This is difficult to do without the absorptive coating spreading on to an adjacent functional face. Another approach is to make the riser slopes 414 highly scattering, so that the light 416 exiting through the riser slopes 414 is highly scattered, thus reducing the brightness of the ghost image. Again, it is difficult to make the riser slopes 414 highly scattering without adversely affecting the functional surface 404. In addition, this does not eliminate the ghost image 416, but scatters it, resulting in a reduction in resolution.

The input face 410 of the Fresnel lens 400 may be treated, for example with a matte finish, to reduce the amount of light specularly reflected into the reflected ray 412. This approach may, however, reduce the amount of light entering the Fresnel lens, or may scatter light, thus affecting resolution. The input face 410 and/or the functional face 404 may also be treated with an anti-reflection coating to reduce the amount of light reflected into ray 412. This approach has limited utility, however, since anti-reflection coatings have a limited bandwidth and effective cone angle, outside of which the reflection is not significantly reduced. Therefore, since the anti-reflection coating on the input face 410 and/or functional surface 404 has to operate over a wide range of wavelengths and incident angles, the anti-reflection coating is not a very satisfactory approach to reducing the brightness of the ghost.

It is important to, note that a mild matte finish or an antireflection coating may also be provided on the input, face 410 of the Fresnel lens 400 in order to reduce ghost images that arise from specular reflections from the input face 410 interacting with the optical system used with the screen, for example turning mirrors.

Another approach to reducing the brightness of the ghost image is to provide some optical interaction within Fresnel lens itself, by loading the Fresnel lens with optically interacting particles 422, to reduce the ghost image. Examination of FIG. 4 shows that light in the primary image 418 travels only a short path through the Fresnel lens 400, whereas the light 416 in the ghost image travels a much longer distance within the Fresnel lens. If the optically interacting particles 422 disposed within the lens 400 are scattering particles, then the light in the reflected beams 408 and 412 has a high probability of being scattered, for example as scattered ray 420, before emerging as the ghost image 418. On the other hand, the light 418 in the primary image has a smaller probability of being scattered. Furthermore, since the ghost image 416 has a relatively long path length within the lens 400, there is typically a greater separation between the ghost image and the light scattered from reflected beams 408 and 412. Therefore, the ghost image 416 may be made less noticeable because of significant scattering, while there is only a small reduction in resolution in the primary image 418. The degree of scattering within the Fresnel lens is selected to reduce the ghost image while maintaining the primary image.

In another approach, the optically interacting particles 422 disposed within the Fresnel lens 400 may be absorbing particles, in which case the light 416 in the ghost image has a high probability of being absorbed due to its long path length within the Fresnel lens 400. On the other hand, the light 418 in the primary image has a smaller probability of being absorbed. Therefore, the ghost image 416 may be made less noticeable because a significant fraction of its light has been absorbed, with only a small reduction in brightness of the primary image 418, and no affect on the resolution. The degree of absorption within the Fresnel lens 400 is selected to reduce the ghost image 416 while maintaining the primary image 418. It will be appreciated that the optically interacting particles 422 may include a mixture of absorbing and scattering particles.

In one embodiment of the present invention, the thickness of the Fresnel lens is reduced, with a resultant reduction in the separation between the ghost image and the primary image. In the present invention, the thin Fresnel lens may be supported by being attached to an optical layer on the output side of the Fresnel lens. Supporting the Fresnel lens on the optical layer on the output side of the lens also reduces the separation between the lens and the optical layer, further reducing the separation between the ghost and primary images.

Figure 5A:
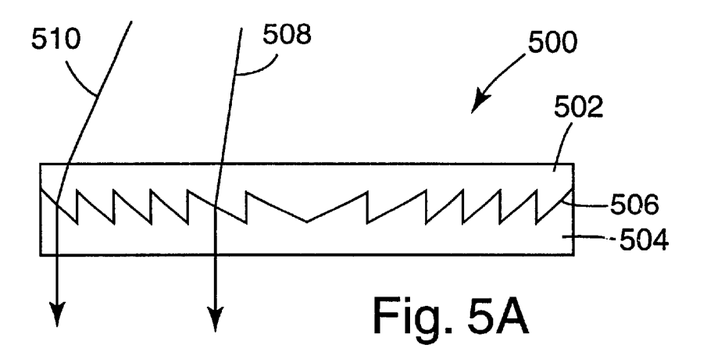
FIGS. 5A–5F illustrate different embodiments of embedded Fresnel lenses according to the present invention.
Figure 5B:
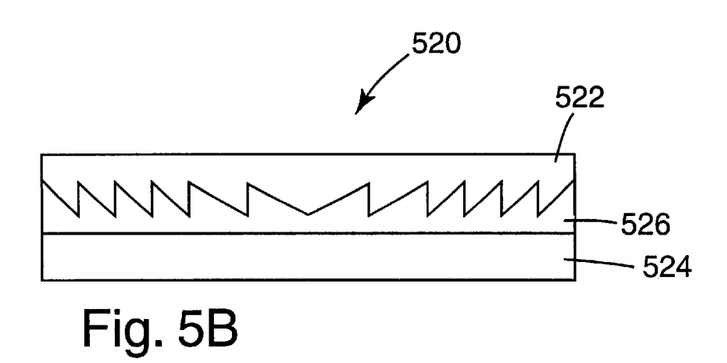
Figure 5C:
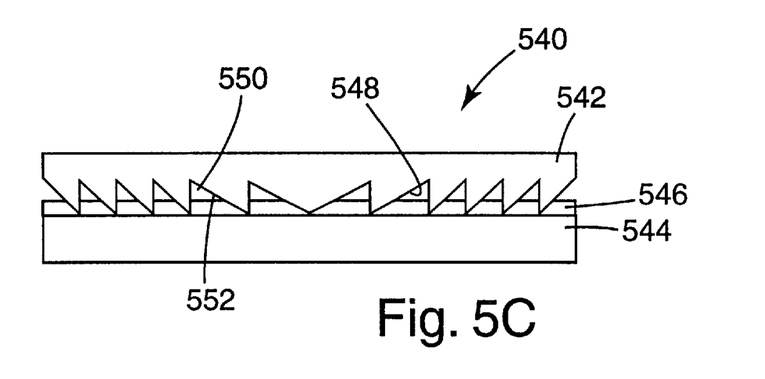

One particular approach to supporting a thin Fresnel lens is illustrated in FIGS. 5A–5C, which show different embodiments of an "embedded" Fresnel lens, where at least a portion of the Fresnel lens is embedded in the screen.

Considering first the embodiment illustrated in FIG. 5A, the screen 500 is formed from a support layer 504 and the Fresnel lens 502. The Fresnel structure 506 of the Fresnel lens 502 is embedded completely in the support layer 504. The support layer 504 may be a diffusing screen film. However, there is no requirement that the support layer 504 be a diffusing film, and there is no intention to limit the invention to such. The support layer may be another suitable type of dispersing screen, such as a lenticular screen, a beaded screen, a surface diffusing screen, a holographic diffusing, or a micro-structured diffusing screen. This list is not intended to be exhaustive.

Figure 5D:
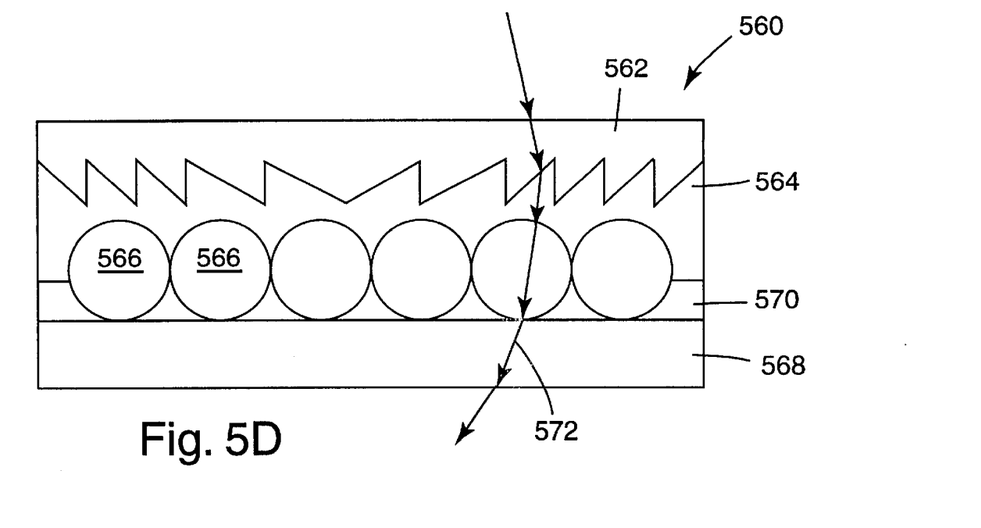

An example of a support layer including a beaded screen, for example as is described in U.S. Patent Application Serial No. 09/192,118, and incorporated herein by reference, is illustrated in FIG. 5D. The screen 560 includes a Fresnel lens 562 embedded in a first transparent layer 564 having a lower index of refraction than the Fresnel lens 562. A layer of refracting beads 566 is disposed between the first transparent layer 564 and a second transparent layer 568. The beads 566 are embedded in a layer of absorbing material 570 that prevents light from passing through the interstices between the beads. The upper surfaces of the beads 566 receive light 572 from the Fresnel lens 562. The light 572 is focused by the beads 566, with the result that the light 572 diverges after passing through the screen 560.

Figure 5E:
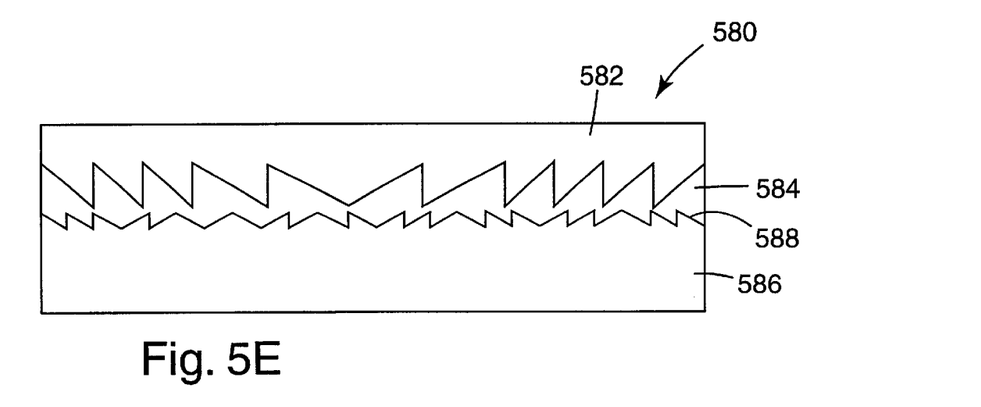

An example of a screen 580 having a surface diffuser screen is illustrated in FIG. 5E. The screen 580 includes a Fresnel lens 582 embedded in a first transparent layer 584 having a lower index of refraction than the Fresnel lens 582. The transparent layer 584 is laminated to a surface diffuser 586 having a refractive index different from that of the transparent layer 584. Light passes through the Fresnel lens 582, where it is re-directed, through the first transparent layer 584 and then through the surface diffuser 586: the light is typically scattered when passing through the diffusing surface 588 of the surface diffuser 586. In the example illustrated, the transparent layer is laminated to the diffusing surface 588 of the surface diffuser 586. The diffusing surface 588 may be, for example, a holographic diffusing surface as shown, or may be a random or microstructured surface. The diffusing surface 588 may also be on the output surface of the surface diffuser 586, rather than the input surface. Furthermore, the surface diffuser may also be loaded with scattering particles to provide additional bulk diffusion.

The redirecting effect of a functional surface of the Fresnel structure depends on the difference in refractive index between the material of the Fresnel lens and the material into which the redirected rays propagate. In a conventional Fresnel lens with the Fresnel structure in air, there is a large refractive index difference because the redirected rays pass into air from the Fresnel lens. In the case of an embedded Fresnel, the difference in refractive index is reduced, since the support layer 504 has a refractive index higher than that of air. It is generally advantageous to increase the difference between refractive indices of the Fresnel lens 502 and the support layer 504. Materials that may be used for the Fresnel lens 502 include polycarbonate, polystyrene, epoxy acrylates and modified acrylates, or other suitable materials, such as a resin loaded with fine, high index inorganic particles. Materials that may be used for the support layer 504 include fluoropolymers and acrylics, such as polyvinyl fluoride, cellulose acetate, cellulose tri-acetate or cellulose acetate butyrate. The design of the Fresnel structure 506 is based on the refractive index difference between the lens 502 and the support layer 504, so that light rays 508 and 510 entering the Fresnel lens 502 from an illumination source positioned at a design distance from the Fresnel lens 502 source, emerge from the Fresnel lens 502 into the support layer 504 in parallel directions.

The Fresnel lens need only redirect light towards the viewer to have a beneficial effect, and need not collimate the light. Nevertheless, in certain situations, collimation may be preferred in order to maximize overall screen performance. Therefore, in the description of the invention, the use of the term redirecting should be understood to include redirecting light through the Fresnel lens so as to be more advantageous to the viewer. This covers redirecting light so that the beam of light diverges from the Fresnel lens; parallelizing, or collimating, the light so that the transmitted beam essentially neither diverges not converges, and redirecting the light beam so as to converge at some point beyond the Fresnel lens. This range of possibilities may be regarded as bending the light so that it emerges from the Fresnel lens at one, or more, angles selected within a continuum of angles ranging from very little redirection, in which case the light diverges from the lens, to a significant amount of redirection, in which case the light converged from the lens.

Figure 14A:
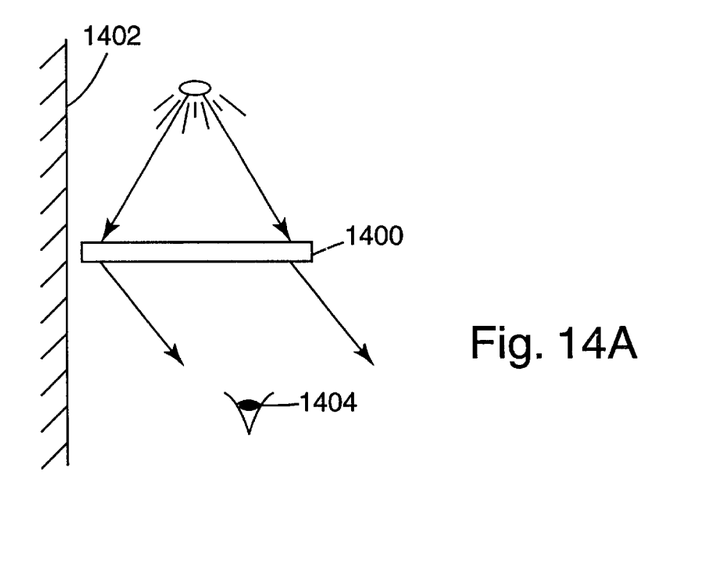
FIGS. 14A and 14B illustrate applications using screens with Fresnel lenses having nonuniform focal profiles.
Figure 14B:
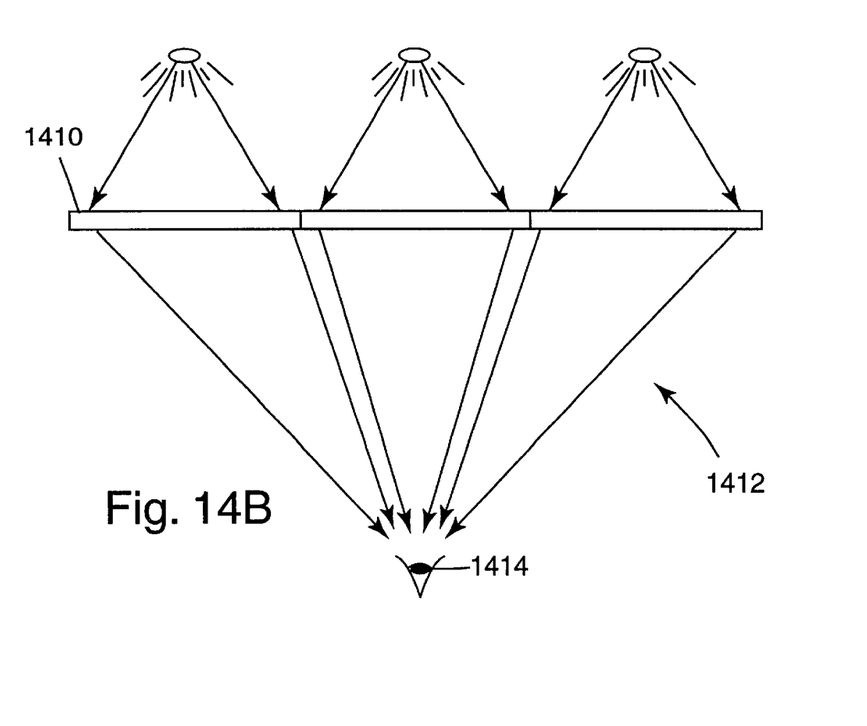

It should also be appreciated that the focal length of the Fresnel structure need not be constant across the width of the lens. For example, the focal length of the Fresnel lens may reduce from a high value at the center of the lens to a low value the edge of the lens. In such a configuration, the light in the center portion may be barely affected by the lens, while the light at the edge of the lens is redirected through a large angle. Moreover, the profile of the focal length, i.e. the value of focal length compared with position across the lens, need not be symmetrical, but may be asymmetrical so as to direct light towards one edge of the screen. This may be useful where, for example, the screen 1400 is mounted close to a wall 1402 and the viewer 1404 is positioned away from the wall 1402, as shown in FIG. 14A. This may also be useful where the screen 1410 is positioned at the edge of an array 1412 of screens, and it is desired to direct the light towards the viewer 1414 who is positioned centrally relative to the array 1412 of screens.

Several different methods may be used for making the screen 500. The Fresnel lens 502 may be formed using one or more of several different methods, including, but not limited to, embossing, extrusion, casting and curing, compressive molding and injection molding. After the Fresnel lens 502 has been formed, the support layer 504 may be formed by one of a number of coating techniques. For example, polymeric material for the support layer 504 may be poured on to the Fresnel structure, and the material knife-coated thereover to fill in the grooves of the Fresnel structure. The polymeric material may then be processed, for example cured, dried, or cooled, to create a permanent support layer 504. Without limiting the invention, the polymeric material may be UV curable, solvent-based, solventless, dryable, or thermoplastic. Other coating techniques that may be used include rolling, dipping, die coating, spinning, and spray coating.

It will be appreciated that a complementary process may be followed, where the support layer 504 is formed first, having the complement of the Fresnel structure on one surface. In such a case, the support layer 504 may be formed by a process such as embossing, extrusion, casting and curing, compressive molding and injection molding. The Fresnel layer may then be formed on top of the support layer 504 using a coating technique, for example as described in the previous paragraph. The complementary surface on the support layer 504 acts as a mold to form the Fresnel lens.

In another approach to an embedded Fresnel screen, illustrated in FIG. 5B, the screen 520 includes a Fresnel lens 522 attached to a central layer 526. The support layer 524 is attached to the other side of the central layer 526. In this embodiment, the central layer 526 is formed from a material having a lower refractive index than that of the Fresnel lens 522. The central layer may be, for example an adhesive layer, such as a pressure sensitive adhesive, iso-octal acrylate-acrylic acid copolymer or thermoplastic hot melt adhesive. The three layer structure may be assembled by lamination, thermoforming, compression molding, or ultrasonic or RF welding.

It will be appreciated that the design of the Fresnel lens structure 506 and 522 in the respective embodiments takes into account the change in refractive index for light propagating from the Fresnel lens 502 or 522 into the adjacent layer 504 and 526, respectively. Therefore, the design of the Fresnel lens need not be identical to a design for a Fresnel lens operating in air. However, the Fresnel groove structure 506 and 528 is designed to substantially redirect light propagating through the Fresnel lens 502 and 522 in a preferred direction, which may include collimation.

In another approach to an embedded Fresnel, illustrated in FIG. 5C, the screen 540 includes a Fresnel lens 542 attached to a central layer 546. The support layer 544 is attached to the other side of the central layer 546. The Fresnel structure 548 of the Fresnel lens 542 is partially embedded in the central layer 546, leaving air gaps 548 between the functional slopes 552 of the Fresnel structure 548 and the central layer 546. Such a screen 540 may be formed, for example, by coating the support layer 544 with a thin layer of adhesive to form the central layer 546, and then pressing the Fresnel lens 542 through the adhesive central layer 546. The screen 540 may then be processed to fix the central layer 546, for example by UV curing, heating, cooling, drying and the like. An advantage of this embodiment is that a thin Fresnel lens is provided with support, while still maintaining a large refractive index difference between the lens material and air. The support layer 544 may be a diffusing layer.

Figure 5F:
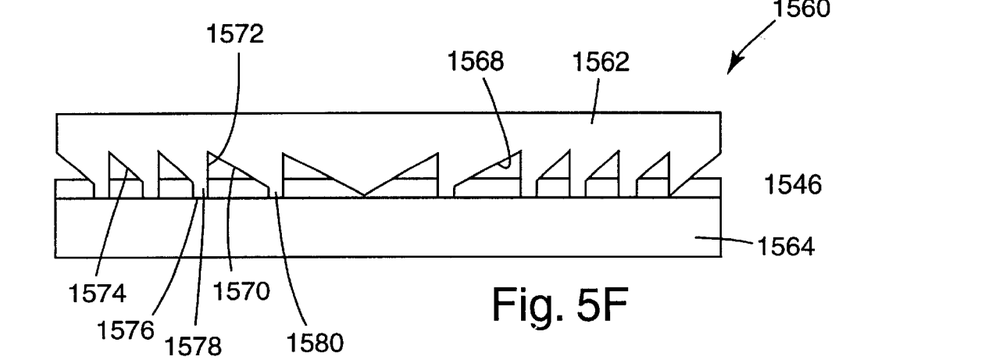

Another approach to an embedded Fresnel is illustrated in FIG. 5F. A screen 1560 includes a Fresnel lens 1562 attached to a central layer 1566. The support layer 1564 is attached to the other side of the central layer 1566. The output surface 1568 of the Fresnel lens 1562 has a Fresnel structure 1570 that includes rising slopes 1572 and functional slopes 1574. The peak 1576 between adjacent functional and rising slopes 1572 and 1574 of the Fresnel structure 1570 need not have the simple triangular cross-section as illustrated in FIG. 5C, where part of the functional slope is embedded in the central layer 1546. In this case, the peak 1576 has an embedded portion 1578 having a different cross-sectional shape. The case illustrated has embedded portions that are square or rectangular in cross-section. Other cross-sections may be used. An advantage provided by the embedded portion 1578 is that the peak 1576 may suffer less damage when being pushed through the central layer 1546, than the structure illustrated in FIG. 5C.

The embedded portions 1578 may correspond to the inactive, or unused, portions of the Fresnel structure 1570, which are larger closer to the edge of the lens 1562. In one approach, the embedded portions 1578 may be larger closer to the edge than the center of the lens 1562, with smaller embedded portions 1580 closer to the center of the lens 1562. Furthermore, the center portion of the lens 1562 may be provided with the embedded portions 1580, even though corresponding functional slopes have no inactive portions. The embedded portions 1580 at the center of the lens 1562 need not significantly affect the re-directing capabilities of the lens 1562, since light propagating through the center portion of the lens 1562 typically requires less re-direction than light propagating through the edge of the lens 1562.

It will be appreciated that the partially embedded Fresnel lenses 542 and 1562 illustrated in FIGS. 5C and 5F may be also be formed from Fresnel lenses partially embedded directly into the respective support layers 544 and 1564, rather than being partially embedded into a central layer.

The embedded Fresnel approach permits the Fresnel lens to be very thin, for example below 0.010 inches thick, thus substantially reducing the separation between the primary image and the ghost image formed by the Fresnel lens.

Figure 6:
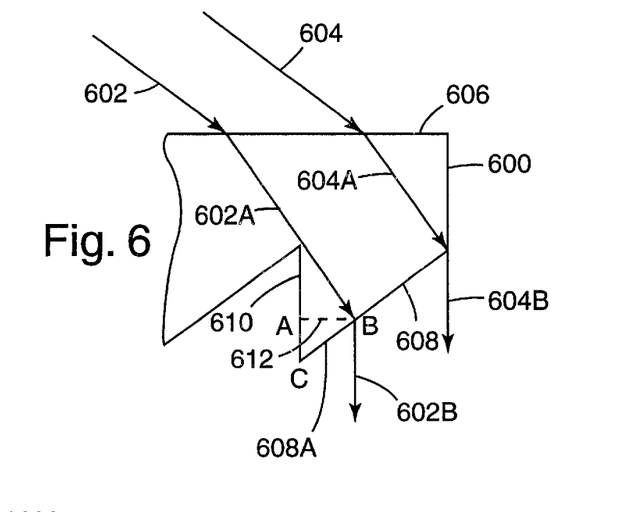
FIG. 6 illustrates the occurrence of an inactive region in a Fresnel lens.

Another approach for mounting a Fresnel lens to a support layer is described with reference to FIGS. 6 and 7. This approach is termed the "flat-top" Fresnel. The basis of the flat-top Fresnel approach is described with reference to FIG. 6, which illustrates a portion of a Fresnel lens 600 and two rays 602 and 604 incident on the input face 606 of the lens 600. Each ray 602 and 604 is refracted upon entering the lens 600 to produce internal rays 602A and 604A, respectively. The internal rays 602A and 604A are incident on the functional surface face 608, and are refracted upon passing therethrough, to produce redirected rays 602B and 604B.

A portion 608A of the functional surface 608 remains optically unused since it lies in the shadow of the adjacent riser slope 610. Accordingly, that triangular portion of material labeled ABC incorporating the inactive portion 608A is not used to redirect light passing through the Fresnel lens 600. This triangular portion of material ABC may be removed from the Fresnel lens 600 to produce a flat surface 612 along the line AB. The surface 612 may be used for attaching the Fresnel lens 600 to a supporting film.

Figure 7A:
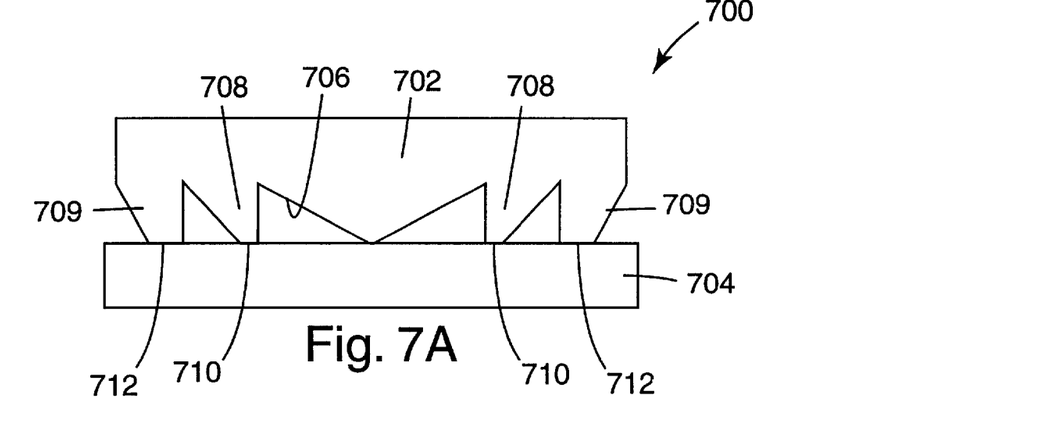
FIG. 7A–7C illustrate flat-top Fresnel lenses according to embodiments of the present invention.

A screen 700 incorporating a flat-top Fresnel lens is illustrated in FIG. 7A. The screen 700 is formed from a Fresnel lens 702 that is contacted to a support layer 704. The support layer 704 may be, for example, a diffusing screen. The Fresnel lens 702 has a Fresnel structure 706 with truncated tips 708 and 709 that have respective flat surfaces 710 and 712 for attaching to the support layer 704. The width of the flat surface 712 of the outer tips 708 is typically wider than the width of the flat area 710 of the inner tips 708, because the angle at which light is incident on the Fresnel lens is greater towards the lens edge, thus creating a larger "shadow" region at the edge that may be removed to produce the flat contacting surfaces.

The flat-top Fresnel screen 700 is advantageous in that it provides a substantial flat area for attaching the Fresnel lens 702 to the support layer 704, thus providing support to a thin Fresnel lens. The flat-top design also maintains an air gap between the active portions of the Fresnel structure 706 and the support screen 704, permitting the lens designer to rely on a large refractive index difference when designing the Fresnel structure. A larger refractive index difference permits the reduction in the angle of the functional portions of the Fresnel structure 706, thus increasing the manufacturability of the Fresnel lens. In addition, from a manufacturing viewpoint, there is a low probability of adhesive migrating into the grooves of the Fresnel lens when assembling the screen, and the use of truncated tips reduces the opportunity for damaging the tips of the Fresnel lens. Furthermore, the separation between the ghost image and the primary image may be substantially reduced, if not removed, because the Fresnel lens is in close proximity to the support layer and the Fresnel lens may be made to be thin, for example down to 0.010 inches or less.

Figure 7B:
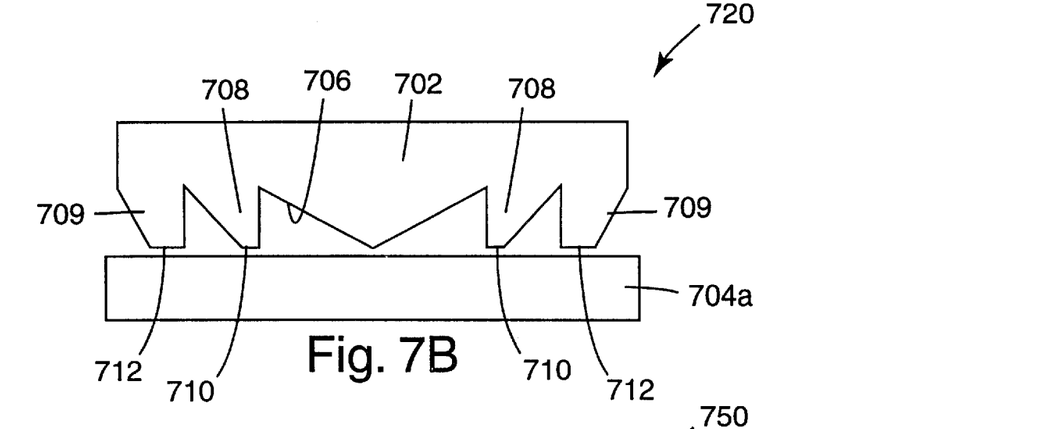

Another advantage provided by the flat-top Fresnel lens 702 is that, even if not in direct contact with the second layer 704a, the truncated tips 708 and 709 permit the Fresnel structure to approach more closely to the second layer 704a, for example as illustrated in FIG. 7B. The close proximity between the lens 702 and the second layer 704a, for example a dispersing screen such as a diffuser or the like, reduces the separation between the ghost image and the primary image. In such a case, the lens 702 may be held taut in a perimeter frame.

Figure 7C:
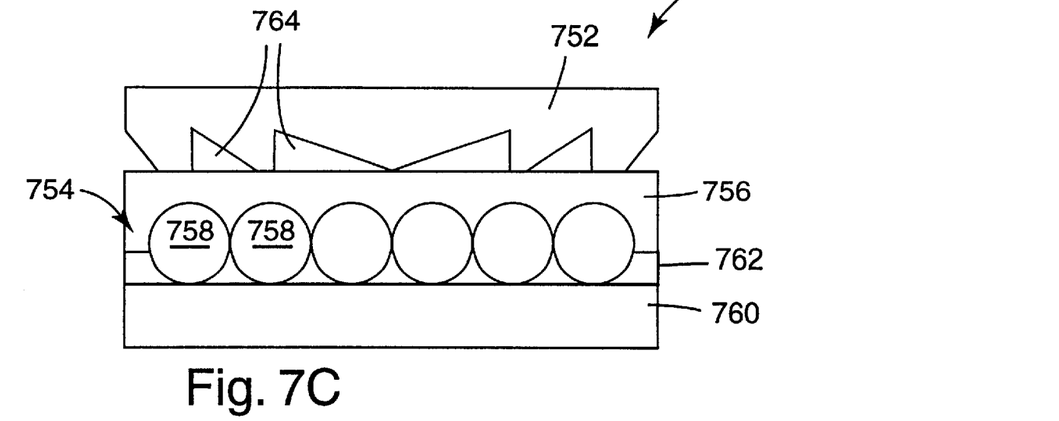

Another example of a screen that uses a flat-top Fresnel lens is illustrated in FIG. 7C. Here, the screen 750 includes a flat-top Fresnel lens 752 attached to a beaded screen 754 having an upper transparent layer 756, a layer of beads 758, and a lower transparent layer 760. An opaque layer 762 prevents light from passing through the interstices between the beads 758, and may also prevent reflection of ambient light from the front of the screen 750. As is discussed in U.S. patent application Ser. No. 09/192,118, the gain of the screen may be adjusted by varying the difference in refractive index between the beads 758 and the upper transparent layer 756. An advantage of using a flat-top Fresnel lens 752 with the beaded screen 754 is that light passing through the Fresnel lens 752 passes into the air gaps 764 between the Fresnel lens 752 and the upper transparent layer 756. Therefore, the refractive index of the upper transparent layer 756 may be adjusted to produce a desired screen gain without affecting the re-directing, or collimating, effect of the Fresnel lens 752.

Figure 8:
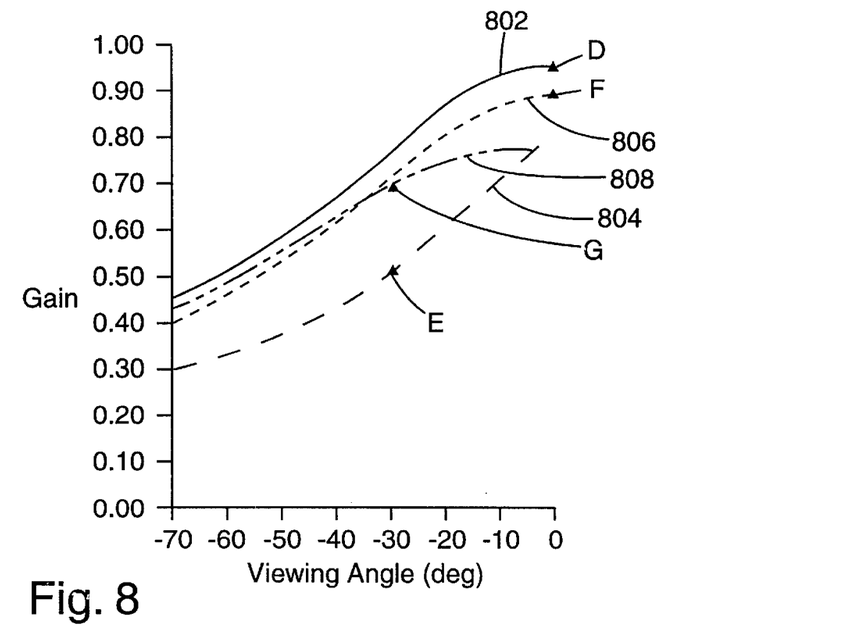
FIG. 8 is a graph showing gain at the center and edge of a screen as a function of viewing angle for diffusing screens with and without a Fresnel lens.

The improvement in uniformity of brightness across a screen that may be gained from using a flat-top Fresnel screen is illustrated in FIG. 8, which shows gain as a function of a viewing angle. Curves 802 and 804 correspond to the gain curves for a diffusing screen alone, and were previously presented in FIG. 2. The upper curve 802 illustrates the gain for light incident on the screen at an angle of θ=0°, while the lower curve 804 illustrates the gain for light incident on the at the edge of the screen. For normal-incidence viewing at the center of the screen, the gain at the center (at a viewing angle of 0°) is 0.97, point D. The gain at the edge of the screen (at a viewing angle of −30°) is 0.51, point E.

The brightness is significantly more uniform across the screen that includes the flat-top Fresnel lens, curves 806 and 808. The gain measured for the center of the screen is represented by the solid curve 806 and the gain measured for the edge of the screen is represented by the dashed curve 808. The solid curve 806 closely tracks the ideal curve for a Fresnel-collimated screen 802, except for a small loss in gain that is caused by reflective loss introduced by the flat-top Fresnel lens. The gain seen by a viewer at the center of the screen having the flat-top Fresnel lens (viewing angle =0°) is 0.91, point F, while the gain at the edge of the screen (at a viewing angle of −30°) is 0.70, point G. Therefore, the drop in brightness from the center to the edge of the screen with the flat-top Fresnel lens is approximately 23%. The drop in brightness from center to edge for the ideal screen, curve 802, is about 20%, very close to the value of 23% for the screen with the flat-top Fresnel. Therefore, the flat-top Fresnel screen is effective at collimating the light from the light source and making the screen brightness uniform. The flat-top Fresnel lens has no additional support other than the diffusing screen, and may be made sufficiently thin that no ghost images are apparent to the viewer.

It should be noted that the Fresnel lens 542, illustrated in the embedded Fresnel embodiment of FIG. 5C, may be embedded into the central layer 546 to a depth where the optically inactive portions of the Fresnel structure are embedded while the optically active portions 550 of the functional slopes 552 are exposed to the air gaps. Such a design permits the Fresnel lens 542 to operate with a large refractive index difference between the Fresnel lens and the air, while maintaining the supporting function of the support layer, and also while holding the thin Fresnel lens close to the support layer to reduce the appearance of ghost images.

Another approach to supporting a Fresnel lens on a support layer is illustrated with respect to FIGS. 9–12. This approach is termed a "partial Fresnel".

Figure 9:
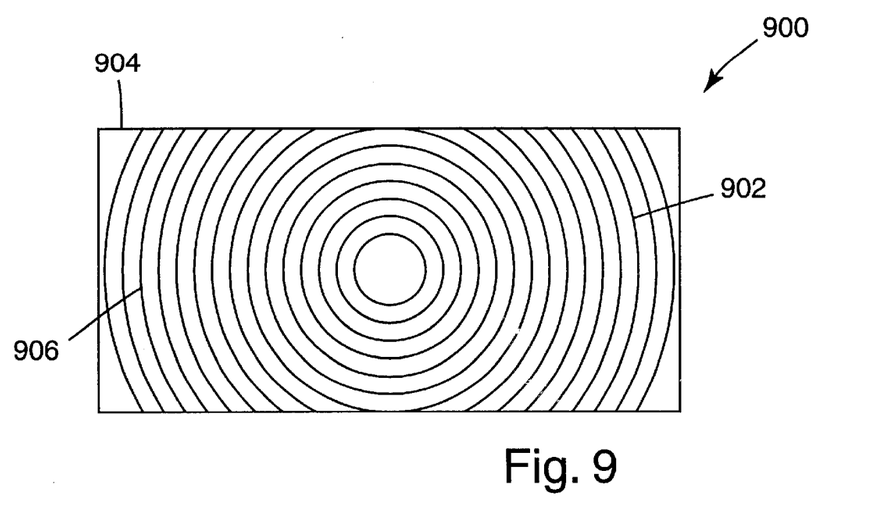
FIG. 9 illustrates a Fresnel pattern over an entire screen area.

Screens having a Fresnel lens typically have the Fresnel structure covering the entire screen. This is illustrated in FIG. 9, where the screen 900 is formed from a Fresnel lens 902 and a support layer 904. The Fresnel structure 906 on the Fresnel lens 902 covers the entire surface of the screen 900.

One method of fabricating a screen 900 is to apply the Fresnel lens 902 to the support layer 904. However, certain difficulties may arise in applying a Fresnel lens to a support layer 904. For example, the radially grooved structure 906 of the Fresnel lens 902 may lead to air entrapment when laminating one film to another, resulting in cosmetic defects apparent to the viewer. Therefore, it may be advantageous to avoid having the Fresnel structure where it is not needed. In particular, from the discussion above with regard to FIG. 8, it is apparent that redirection is required mostly at the side edges, especially across the width of the screen, and at the four corners of the screen to increase perceived brightness in these areas, while little redirection, if any, is required at the center of the screen.

Figure 10:
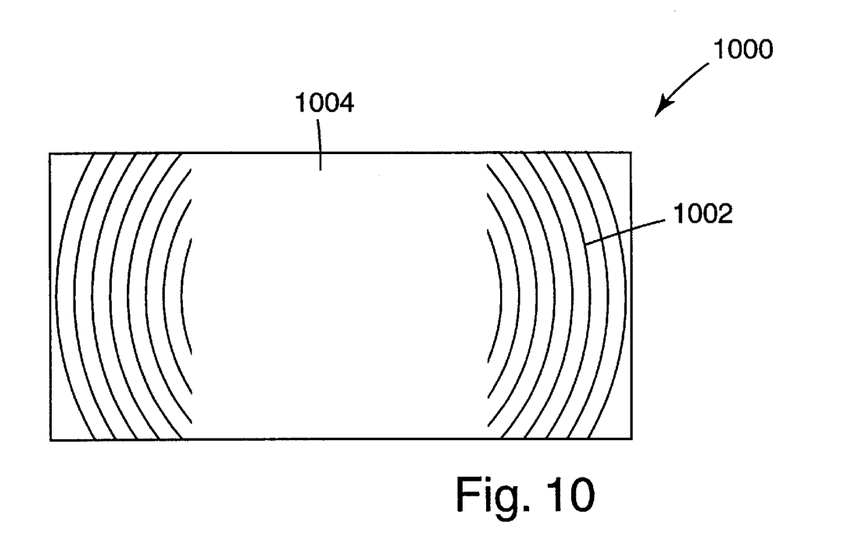
FIG. 10 illustrates a partial Fresnel pattern over a portion of a screen, according to the present invention.

Therefore, a screen may include a Fresnel lens that has a Fresnel structure only at those portions of the screen where redirection is required, e.g. at the edges and corners. Such an approach is illustrated in FIG. 10, which shows a screen 1000 with a Fresnel pattern 1002 at the edges and corners of the screen 1000. The central portion 1004 of the screen does not have any Fresnel structure, since there is less need for redirection of light in the central portion 1004 of the screen 1000. An advantage of this embodiment is that the number of defects arising during manufacture, e.g. due to air entrapment, may be reduced, thus enhancing the yield of acceptable screens. Additionally, since air facets are eliminated in the central portion and the angle of incidence is low, thus reducing reflection losses, the gain of the central portion of the Fresnel lens may be increased.

Figure 11A:
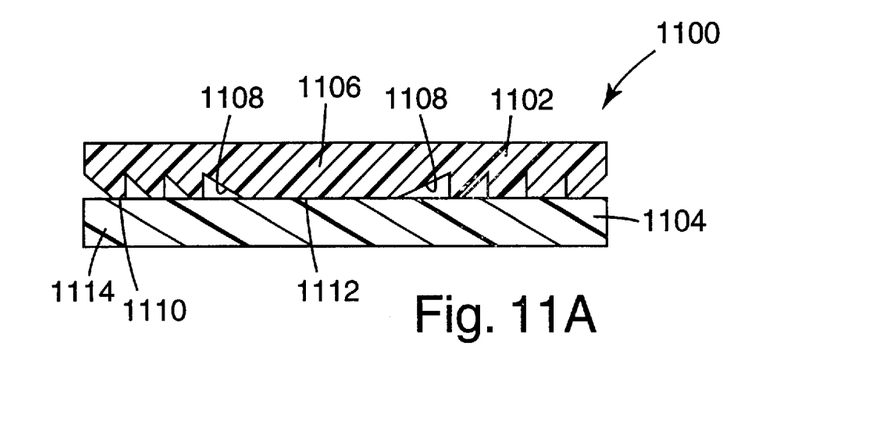
FIGS. 11A, 11B and 12 illustrate cross-sections through different embodiments of partial Fresnel screens according to the present invention.

One particular approach to implementing a partial Fresnel lens is illustrated in FIG. 11A, which shows a cross-section of a screen that uses a Fresnel film 1102 attached to a support layer 1104. The Fresnel film 1102 has a central portion 1106 that lacks a Fresnel structure and is, in this case, essentially flat. The edges of the Fresnel film 1102 are provided with a Fresnel grooved structure 1108 to redirect the light passing through the edges 1114 of the screen 1100.

Here, the term attached is used to describe any method by which the Fresnel lens is joined to the support layer, such as adhesion, with or without an adhesive layer, lamination, heat lamination, fusion, or ultrasonic or RF bonding or welding, or the like.

In this particular embodiment, the Fresnel lens 1102 is also a flat-top lens where the tips of the Fresnel structure have flat surfaces 1110 for contacting to the support layer 1104.

Figure 11B:
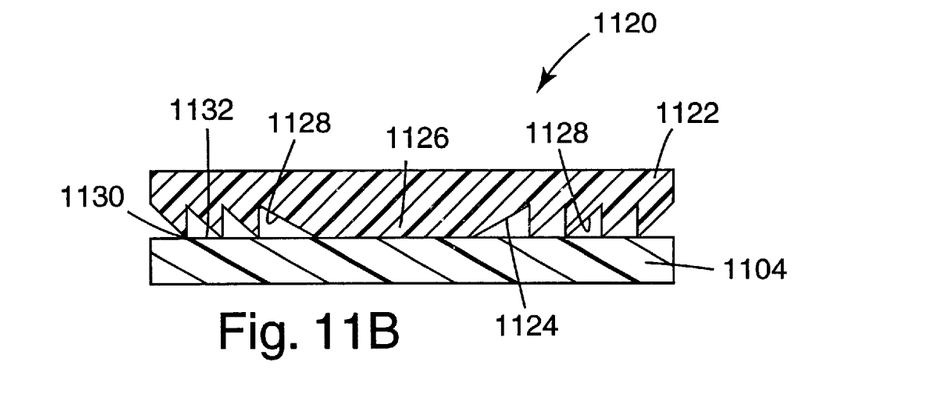

In another embodiment 1120, illustrated in FIG. 11B, the Fresnel lens 1122 includes an output face 1124 having a flat central portion 1126. The Fresnel structure 1128 at the edges of the lens 1122 has tips 1130 formed by the functional and riser slopes. The height of the flat central portion 1126 is selected to be approximately the same height as the tips 1130 so that the tips 1130: are close to contacting, or are in contact with, the surface 1132 of the support layer 1104.

Figure 12:
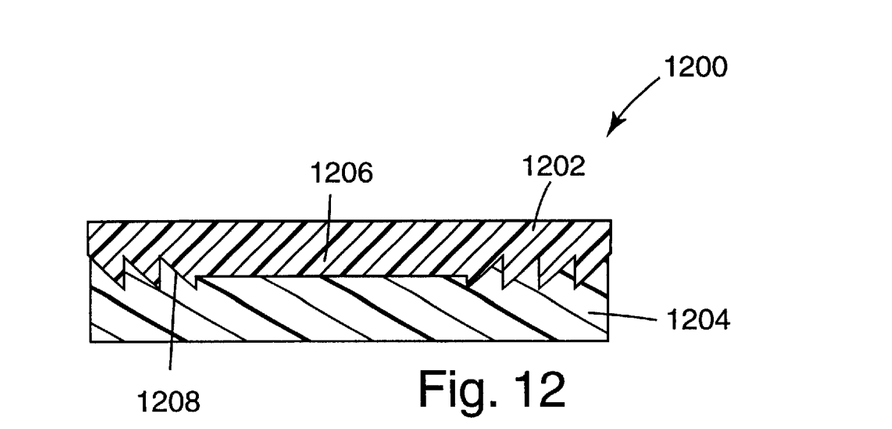

Another approach to a partial Fresnel structure, that also includes an embedded structure, is illustrated in FIG. 12. The screen 1200 has a Fresnel lens 1202 embedded in a support layer 1204. The Fresnel lens 1202 has a central region 1206 that is free of a Fresnel structure and is attached to the support layer 1204. There is a Fresnel structure 1208 at the edges of the Fresnel lens 1202 that is embedded in the support layer 1204. The refractive index of the support layer 1204 is less than the refractive index of the Fresnel film 1202. The Fresnel structure 1208 is designed to redirect light entering the support layer 1204 from the Fresnel film 1202.

It will be appreciated that other combinations of approaches may be used for manufacturing a screen with a supported, thin Fresnel lens. For example, a flat-top Fresnel lens may be embedded in a support layer, either having a full Fresnel pattern or a partial Fresnel pattern. Furthermore, a partial Fresnel lens may be partially embedded in a support layer, or a central layer. These are only examples of other approaches, and are not intended to limit the invention.

Figure 15A:
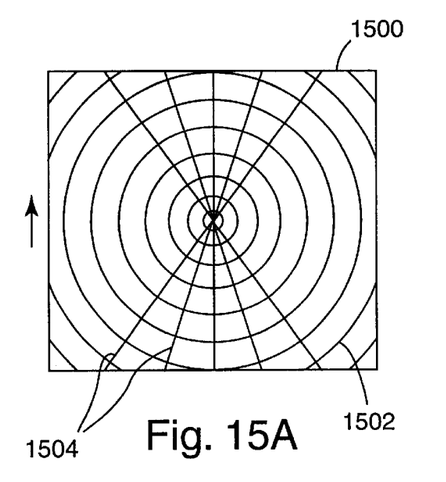
FIG. 15A–15D illustrate different embodiments of Fresnel lenses having grooves to avoid air entrapment during lamination and lens manufacturing.
Figure 15B:
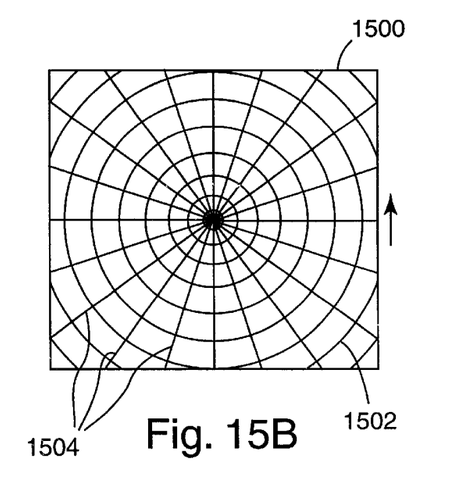

Another approach to reducing the problem of trapping air bubbles when the Fresnel lens is laminated to a screen is illustrated in FIGS. 15A–15D. In this approach, a Fresnel lens 1500 has a full Fresnel structure 1502. Air-relief grooves 1504 cut across the Fresnel structure 1502 permit the passage of air out of one valley of the Fresnel structure into another valley when the lens is being laminated to its supporting layer or when the Fresnel lens is being manufactured. The air-relief grooves 1504 may be cut in different patterns across the Fresnel structure 1502. FIG. 15A illustrates a partial radial pattern of air-relief grooves 1504, such as may be used when the lamination process proceeds in a direction substantially parallel to the arrow. FIG. 15B illustrates a full radial pattern of air relief grooves 1504.

Figure 15C:
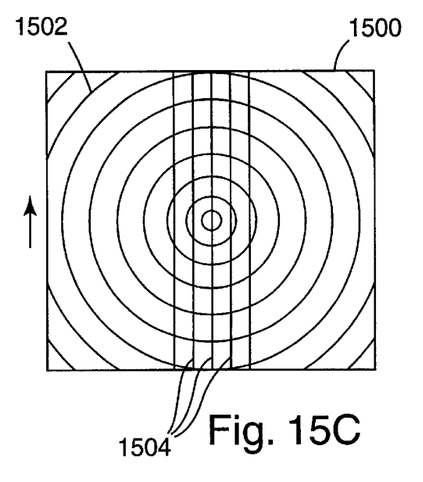
Figure 15D:
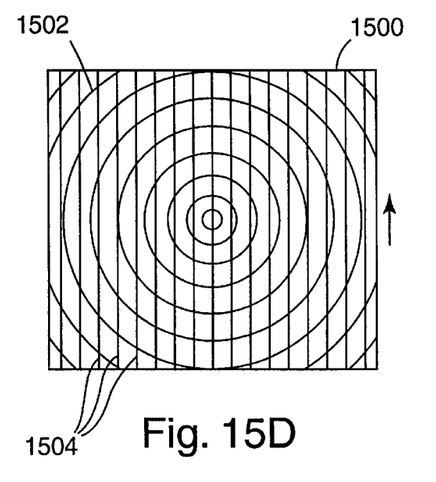

A partial linear pattern of air relief grooves 1504 is illustrated in FIG. 15C, and a full linear pattern of grooves 1504 is illustrated in FIG. 15D. Such linear patterns may be used when the lamination or Fresnel lens manufacturing process proceeds in a direction illustrated by the respective arrows, i.e. substantially parallel to the grooves 1504.

The air-relief grooves 1504 need not be straight, and may take on other shapes so long as they provide relief for air to flow from one valley in the Fresnel structure to another valley.

Figure 16:
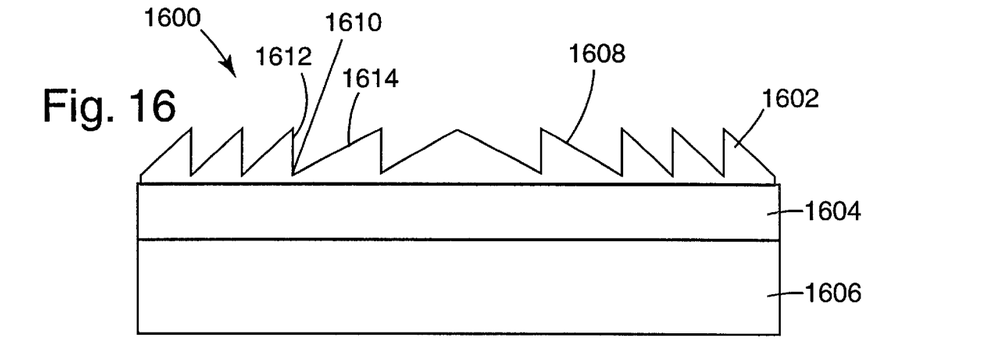
FIG. 16 illustrates a first-surface Fresnel lens according to an embodiment of the present invention.

Another embodiment of a Fresnel-screen that reduces the effect of ghost images is illustrated in FIG. 16. The screen 1600 includes a front surface Fresnel lens 1602 attached, for example by lamination, to a diffusing layer 1604. The diffusing layer 1604 may be attached to a substrate layer 1606 to provide support. An advantage of this screen 1600 is that the "land" between the Fresnel surface 1608 and the diffusing layer 1604, in other words the thickness of Fresnel lens 1602 between the surface of the diffusing layer 1604 and the bottom 1610 of the groove between the riser slope 1612 and the functional slope 1614, may be very small. This reduces-the separation of the ghost image from the primary image.

Figure 13:
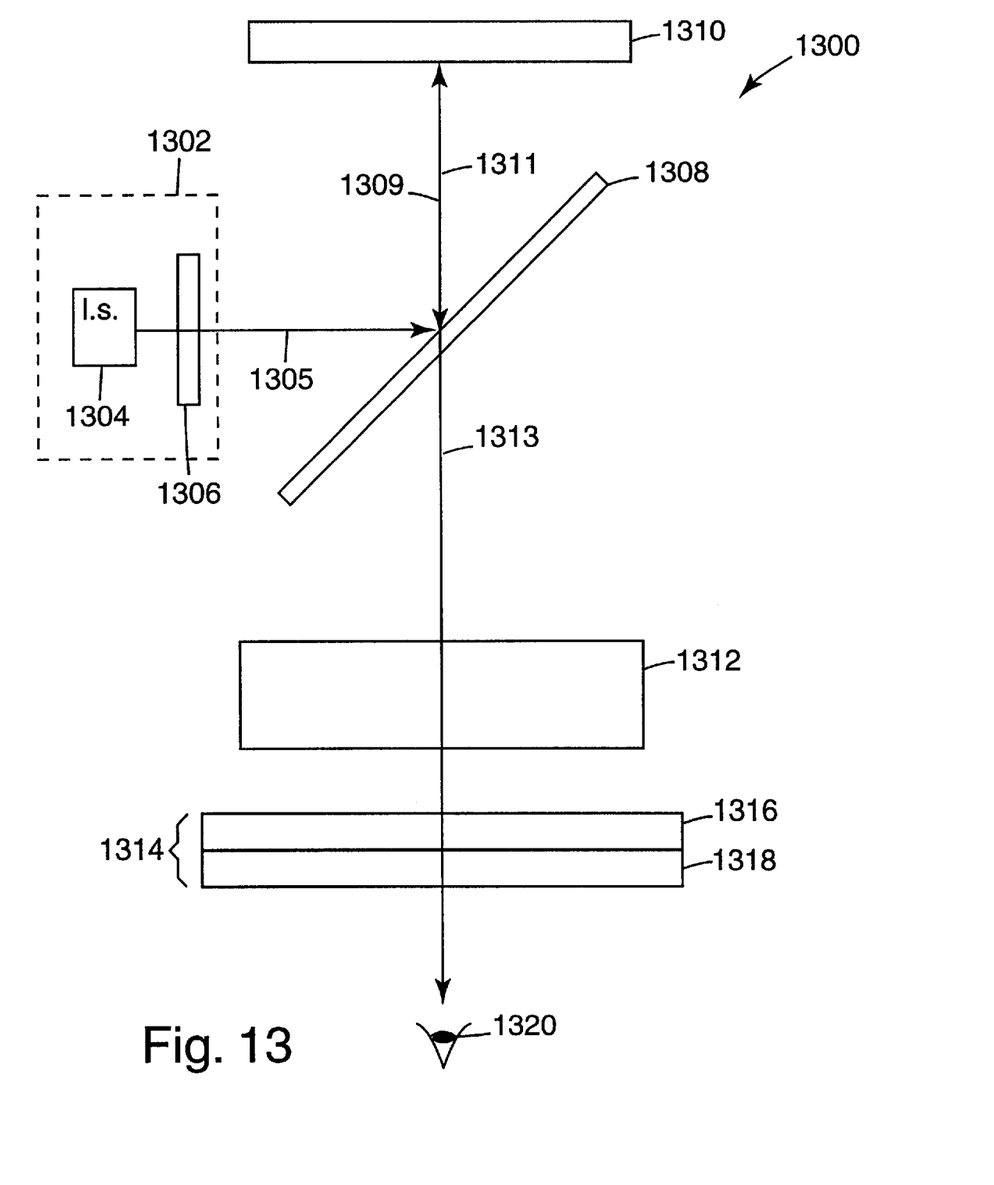
FIG. 13 illustrates a viewing apparatus according to the present invention.

A projection system that employs a screen with a thin Fresnel lens is illustrated in FIG. 13. The projection system 1300 includes a light projector 1302 that includes a light source 1304 (l.s.) that generates a beam of light 1305. The beam of light 1305 may propagate through beam handling optics 1306 before illuminating a reflective polarizer 1308, for example a reflective polarizing sheet as described in PCT publication WO 96/19347. Light of a certain polarization is reflected by the polarizing beam splitter 1308 to a LCD array 1310. The LCD array reflects the light back towards the polarizing beam splitter 1308. The LCD array 1310 spatially modulates the light beam 1309 incident thereon by rotating the polarization through approximately 90°. Therefore, those portions of the light beam 1311 reflected by the LCD array 1310 whose polarization is rotated by the array 1310 are transmitted by the polarizer 1308 as beam 1313. The beam 1313 may pass through transmission optics 1312 before illuminating the screen 1314. The transmission optics 1312 may include, for example, projection lenses and/or a polarizer for cleaning up the image on the screen 1314. The screen 1314 includes a Fresnel lens 1316 followed by a diffusing screen 1318. As discussed above, the diffusing screen may be a bulk diffuser, a surface diffuser, a beaded screen, or the like. The screen 1314 may be any one of the embodiments described above, or a combination thereof, in which a thin Fresnel lens 1316 is supported on a diffusing screen 1318. Light from the screen 1314 is detected by the viewer at position 1320.

FIG. 13 does not show the lateral extent of any of the light beams, but indicates a central ray in each light beam. The lateral extent of the beams is determined, at least in part, by the particular beam handling optics 1306 and transmission optics 1312 employed in the projection system 1300. The projection system 1300 may include one or more folding mirrors to reduce the depth of the system. When the form factor of the system is made smaller for a given size of screen, the divergence of light along the light path between the light source and the screen. increases. This typically increases the need for a redirecting lens, such as a Fresnel lens, at the screen to maintain brightness uniformity and efficient light use.

It will be appreciated that the projection system need not be configured exactly as shown. For example, transmission optics may be positioned between the polarizer 1308 and the LCD array 1310 in addition to, or instead of, the transmission optics 1312 between the polarizer 1308 and the screen 1314. In addition, the projection system may be configured using a transmissive LCD display, rather than a reflective LCD display.

It will be appreciated that the embodiments presented above have been used for illustrative purposes, and that certain features of the illustrated embodiments may be changed without affecting the present invention. For example, the Fresnel lens need not have a circular Fresnel pattern, as illustrated, but may have a Fresnel pattern which is a linear Fresnel pattern, for redirecting light along one axis, or may also be a two-dimensional Fresnel pattern, other thank circular, for redirecting light along two axes.

As noted above, the present invention is applicable to display systems incorporating a Fresnel lens. It is believed to be particularly useful in reducing the effect of ghost images in back projection displays and screens. The use of the Fresnel lens of the present invention permits reduction in the form factor of the screen and high light use efficiency, while reducing ghost images to permit high resolution operation. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A screen, comprising:
   a Fresnel lens having an input surface and an output surface, at least a portion of the output surface including a Fresnel structure, the Fresnel structure including inactive portions positioned so as to be shadowed, by respective adjacent riser slopes, from light passing through the Fresnel lens from the input surface; and
   a first optical layer having a first surface;

wherein the Fresnel structure include ridges formed between functional slopes and respective riser slopes, the ridges including portions extending beyond planes of the respective functional slopes, the ridges being embedded in the first surface so as to supportingly attach the first optical layer to the Fresnel lens.

2. A screen as recited in claim 1, wherein the ridges have one of a square cross-sectional shape and a rectangular cross-sectional shape.

3. A screen as recited in claim 1, wherein the Fresnel structure includes functional slopes disposed at an angle relative a direction of output light redirected by the Fresnel lens and riser slopes, portions of the functional slopes and the riser slopes being attached to the first surface of the first layer, the first surface of the first layer conforming in shape to the portions of the functional and riser slopes attached to the first layer.

4. A screen as recited in claim 3, wherein entire areas of the functional and riser slopes are attached to the first layer.

5. A screen as recited in claim 1, wherein the Fresnel lens includes the Fresnel structure on a portion of the output surface proximate at least one edge of the screen, and the output surface has a flat central portion attached to the first surface of the first layer.

6. A screen as recited in claim 1, wherein an input surface of the Fresnel lens is adapted to reduce specular reflection.

7. A screen as recited in claim 6, wherein the input surface of the Fresnel lens has a matte finish.

8. A screen as recited in claim 1, wherein the Fresnel lens has scattering particles disposed therein.

9. A screen as recited in claim 1, wherein the Fresnel lens has absorbing particles disposed therein.

10. A screen as recited in claim 1, wherein the first optical layer is one of a diffusing screen, a lenticular screen, a beaded screen, a surface diffusing screen, a holographic diffusing screen and a micro-structured diffusing screen.

11. A screen as recited in claim 1, wherein the Fresnel structure has first and second portions, the first and second portions having first and second focal lengths respectively, and the first focal length is different from the second focal length.

12. A screen as recited in claim 1, wherein the Fresnel structure further includes air-releasing grooves disposed to cut across refractive structures to permit air release when the Fresnel lens is laminated to the first layer.

13. A screen as recited in claim 1, further including an image projector having a light source illuminating an input surface of the Fresnel lens.

14. A screen as recited in claim 1, wherein the ridges include surfaces parallel to the first optical layer.

15. A screen, comprising:
a Fresnel lens having a Fresnel structured output surface, the output surface including air relief grooves through ridges of the Fresnel structured output surface; and
an optical layer supportingly attached on a first side to the Fresnel structured output surface.

16. A screen as recited in claim 15, wherein the optical layer includes at least one of a diffusing screen, a lenticular screen, a beaded screen, a surface diffusing screen, a holographic diffusing screen and a microstructured diffusing screen.

17. A screen as recited in claim 15, wherein the Fresnel lens includes a Fresnel structure on an input surface opposing the output surface.

18. A screen as recited in claim 15, wherein the ridges of the Fresnel structured surface are at least partially embedded within the optical layer.

19. A screen as recited in claim 18, wherein the ridges of the Fresnel structured surface are completely embedded within the optical layer.

20. A screen as recited in claim 18, wherein the ridges of the Fresnel structured surface are embedded within the optical layer to a depth so as to define air gaps between the ridges and the first surface of the optical layer.

21. A screen as recited in claim 15, wherein the ridges of the Fresnel structured output surface include flat portions parallel to the optical layer.

22. A screen as recited in claim 15, wherein the Fresnel structured output surface includes a flat portion free of Fresnel structure.

23. A screen as recited in claim 15, wherein the ridges of the Fresnel structured surface are at least partially embedded within the optical layer.

24. A screen as recited in claim 15, further including an image projector directing an image at an input surface of the Fresnel lens.

25. A Fresnel screen, comprising:
a first layer having a first surface; and
a Fresnel lens having a Fresnel-structured output surface including ridges formed by respective functional slopes and riser slopes, at least a portion of one of the ridges being embedded in the first surface of the first layer, the functional slope of the ridge embedded in the first layer and the first surface defining an air gap therebetween.

26. A Fresnel screen as recited in claim 25, further comprising air-relief grooves in ridges formed by functional slopes and adjacent riser slopes.

27. A Fresnel screen as recited in claim 25, wherein the functional and riser slopes are embedded within the first surface of the first layer to a depth where only a shadowed portion of a ridge formed between the functional and riser slopes is embedded within the first surface of the first layer.

28. A screen as recited in claim 25, wherein the ridges of the Fresnel structured surface include flat portions parallel to, and contacted to, the first layer.

29. A screen as recited in claim 25, wherein the Fresnel structured output surface includes a flat portion free of Fresnel structure.

30. A screen as recited in claim 25, further comprising air relief grooves through the ridges of the Fresnel structured output surface.

31. A screen as recited in claim 25, further comprising a light image projector directing an image at an input surface of the Fresnel lens.

* * * * *